(12) United States Patent
Traverso

(10) Patent No.: US 7,103,278 B2
(45) Date of Patent: Sep. 5, 2006

(54) VIRTUAL CONCATENATION OF OPTICAL CHANNELS IN WDM NETWORKS

(75) Inventor: Giovanni Traverso, Rovagnate (IT)

(73) Assignee: Alcatel, Paris (FR)

( * ) Notice: Subject to any disclaimer, the term of this patent is extended or adjusted under 35 U.S.C. 154(b) by 698 days.

(21) Appl. No.: 09/911,625

(22) Filed: Jul. 25, 2001

(65) Prior Publication Data

US 2002/0012141 A1   Jan. 31, 2002

(30) Foreign Application Priority Data

Jul. 28, 2000   (IT) ............ MI2000A1731

(51) Int. Cl.
*H04J 14/02* (2006.01)

(52) U.S. Cl. ............ 398/79; 398/51; 398/54; 398/45; 398/182; 398/183; 398/192; 398/202; 370/536; 370/907; 370/532; 370/474; 375/260

(58) Field of Classification Search ............ 398/51, 398/54, 79, 45, 202, 182, 183, 192; 370/536, 370/907, 532, 474; 375/260
See application file for complete search history.

(56) References Cited

U.S. PATENT DOCUMENTS

| 5,586,273 | A | * | 12/1996 | Blair et al. ............ 710/105 |
| 5,727,090 | A | * | 3/1998 | Yellin ............ 382/245 |
| 6,065,082 | A | * | 5/2000 | Blair et al. ............ 710/105 |
| 6,636,529 | B1 | * | 10/2003 | Goodman et al. ............ 370/469 |
| 6,678,475 | B1 | * | 1/2004 | Turban et al. ............ 398/79 |
| 6,917,630 | B1 | * | 7/2005 | Russell et al. ............ 370/532 |
| 2001/0033570 | A1 | * | 10/2001 | Makam et al. ............ 370/373 |
| 2002/0018468 | A1 | * | 2/2002 | Nishihara ............ 370/389 |
| 2004/0042495 | A1 | * | 3/2004 | Sandstrom ............ 370/489 |
| 2004/0062277 | A1 | * | 4/2004 | Flavin et al. ............ 370/474 |

OTHER PUBLICATIONS

ITU-T G.707 dated Mar. 1996, Series G: Transmission Systems and Media—Digital transmission systems—Terminal equipments—General—network node interface for the synchronous digital hierarchy (SDH).
ITU Recommendation G.709—revised Apr. 12, 2000, Network Node Interface for the Optical Transport Network (OTN).

* cited by examiner

*Primary Examiner*—Hanh Phan
(74) *Attorney, Agent, or Firm*—Sughrue Mion, PLLC

(57) ABSTRACT

A virtual concatenation method for optical channels in WDM networks. In transmission, the method includes providing for a plurality of frames, each frame including a byte reserved for a concatenation flag; writing the same predefined value in the concatenation byte of n frames (n=1, 2, 3, . . . ); and transmitting the n frames via n respective channels ($\lambda_1, \lambda_2, \ldots \lambda_n$). In reception, it includes receiving the first reference frame at one instant; reading the concatenation byte value of the reference frame; receiving the remaining signal frames after a respective determined time; reading the value of the concatenation byte of the remaining signal frames; and identifying and aligning all the signal frames with the same concatenation byte value compensating the reception times.

9 Claims, 4 Drawing Sheets

VIRTUAL CONCATENATION OF OPTICAL CHANNELS IN WDM NETWORKS

INCORPORATION BY REFERENCE OF PRIORITY DOCUMENT

This application is based on and claims the benefit of Italian Patent Application No. MI 2000A 001 731, filed on Jul. 28, 2000, which is incorporated by reference herein.

BACKGROUND OF THE INVENTION

1. Field of the Invention

The present invention pertains to optical telecommunication networks and in particular concerns WDM (Wavelength Division Multiplexing) networks. Furthermore in particular, the present invention is concerned with the virtual concatenation of the optical channels in such WDM networks.

2. Description of the Prior Art

As it is known for instance from the ITU-T Recommendation G. 707, the contiguous concatenation of a number X of Administrative Units 4 (AU-4-Xc) consists in concatenating together a number of AU-4s so as to transport together payloads (information part proper of an SDH frame) that require a greater capacity than the one provided by a single container having capacity 4 (VC4). In this way, the available capacity in the multicontainer 4 is X times the capacity of the single container-4 (for instance, 599040 Mbit/s for X=4 and 2396160 Kbit/s for X=16). In the concatenation of contiguous AU-4s, it is used a concatenation indication, contained in the pointer of the various AU-4s (except the first one), to indicate that the payload of the multicontainer-4 (carried in a single VC-4-Xc) should be kept together. The concatenation indication indicates that the pointer processors shall perform the same operations as performed on the first AU-4 of the AU-4-Xc. Therefore, the assumption made is that the various pointers are equal in such a way that, during the transmission in a network, shifts between one VC-4 and the other are not created, so as to be able to easily read the received data in the correct sequence. The network is required to transport information payload) without changing the value of the various pointers with respect to the first pointer (i.e. there is no reciprocal shifting).

Therefore, the principal objective of the concatenation is to transport, in an advantageous manner, the payload signals having bit rates different from the standard ones for synchronous hierarchy signals.

The so-called Inverse Multiplexing, typical of the ATM (Asynchronous Transfer Mode) transmissions, wherein pipes and high bit rates are transported by different independent signals E1, can be considered as an alternative technique. This technique can be regarded as an adaptation of the client layer to the transport means.

The objective of the concatenation is to provide those transport functionalities avoiding the need to adopt expensive equipment to carry out the adaptation. That is to say, it is the transport apparatus that performs the adaptation function that is not made at client level.

The virtual concatenation (ITU-T Recommendation G. 707) has been developed to provide concatenation functionalities in networks where the contiguous concatenation is not supported, thus avoiding the replacement of all the network elements. In the virtual concatenation, the pointer values shall no longer be strictly connected and, further, it does not exhibit the strictness of the contiguous concatenation that could be realized only with pre-established numbers X, for instance X=4, X=16 or X=64.

The virtual concatenation, therefore, does not affect the complexity of the network elements inside the network, but it complicates only the processing (with adaption operations) at the "peripheral" nodes of the transmission network. This results in an undoubted economic advantage since it may be adopted in all the existing networks without replacing the major parts of the nodes (all the nodes inside the network), merely replacing, or at least adapting, the network input/output peripheral nodes.

Another advantage of the virtual concatenation is that it can be adopted also with any Virtual Container (not only with the VC-4s) of the SONET/SDH hierarchies.

A flag is provided in the POHs (path Overheads) of the various virtually concatenated Virtual Containers (VCs). Such a flag is substantially a counter advancing at every step, i.e. at every POH. The network input mapping is like in the contiguous concatenation but, afterwards, the pointers are free to move relative to one another. Each VC has its own POH. A common counter provides a computation basis where the values are placed on all the POHs (in an identical way, namely the same value on all the POHs). Downstream of the transport network, the demapping occurs: the first VC of the concatenation reaches the value of the other VC counters and the shift accumulated among the various VCs in the transport network is determined. This shift (or staggering) is compensated for through the use of buffers. In this way, the client signal is provided perfectly equalized at the output.

The use of buffers can be considered the sole drawback of the virtual concatenation since it is added to the cost of the terminal nodes of the transport network: obviously this small complexity is negligible as compared with the cost for replacing/updating the nodes, should the concatenation not be used or the contiguous concatenation be utilized.

All the above relates to the SONET or SDH transport network, but the use of similar techniques in the art of WDM optical transport networks is not known. At present the sole possible way known to transport higher bit rates as compared with those carried by single wavelengths, is to split the information into several channels at client level. However, this technique is applicable only in end-to-end services and cannot be applied in the core of the transport network.

SUMMARY OF THE INVENTION

In the light of the prior art drawbacks mentioned above, it is the main object of the present invention to provide a method for making the WDM networks able to transport higher bit rates than those at present carried by a single optical channel, without replacing the existing apparatus and structures.

This object is achieved by means of a virtual concatenation of the optical channels, i.e. lambda concatenation, similar to the virtual concatenation of the Virtual containers in the SDH or SONET synchronous transmissions, set forth in the method for virtually concatenating optical channels in WDM networks comprising providing for a plurality of frames, each frame comprising a byte reserved for a concatenation flag; writing the same value defined in advance into the n-frame (n=1, 2, 3, . . . ) concatenation byte; and transmitting the n frames through n respective channels and in the method for receiving a number n of virtually concatenated signal frames in WDM networks, comprising receiving a first reference frame at an instant to; reading the concatenation byte value of such reference frame; receiving the remaining n−1 signal frames after a respective determined time t: reading the concatenation byte value of the remaining n−1 signal frames; and identifying and aligning all the signal frames with the same concatenation byte value compensating for the receiving time t.

Further advantageous characteristics of the invention are set forth in the dependent claims. For example, an apparatus for virtually concatenating optical channels in WDM networks, comprising a first circuit for writing the same predetermined value into the concatenation byte of n-signal frames (n=1, 2, 3, . . . ); and a transmitter of the n frames through n respective channels and an apparatus for receiving a number n of signal frames virtually concatenated in WDM networks, comprising a first receiver of a first reference frame at an instant to; a first circuit for reading the concatenation byte value of such reference frame; a second receiver of the remaining n−1 signal frames after a respective determined time t; a second circuit for reading the concatenation byte value of the remaining n−1 frames; and a circuit for identifying and aligning all the signal frames with the same concatenation byte value compensating for the receiving times t. The apparatuses are for implementing the method of the invention.

A WDM network comprising circuits for the implementation of the method for virtually concatenating optical channels, a WDM network comprising circuits for the implementation of the method for receiving a number n of virtually concatenated signal frames, a WDM network comprising an apparatus for virtually concatenating optical channels and a WDM network comprising an apparatus for receiving a number n of virtually concatenated signal frames define a WDM network incorporating the features of the present invention. All the claims are intended to be an integral part of the present description.

The basic idea of the present invention is to transport the payloads of WDM transport network in a substantially analogous way as that in which the Virtual Containers (VCs) are transported in the virtual concatenation according to the SDH standards.

It is known that at the high bit rates in the WDM transport networks, the efficiency results in opacity, that is in the need to carry out a certain processing at the electrical level in order to transmit over long distances without the need of repeaters and for the end-to-end management of the optical channel.

From the ITU-T Recommendation G.709 an Optical Channel Transport Unit (OTUk) is known, which is the information structure used to support the data unit of the optical channel (ODUk) over one or more connections of optical channels.

The frame structure of the OTUk (k=1,2,3, . . . ) is arranged into octets with 4 rows and 4080 columns; the most significant bit of each octet is bit 1, the least significant one is bit 8. The OTUk frame comprises three main areas: OTUk OverHead (Row 1, columns 1 to 16); OTUk Payload (Rows 1 to 4, Columns 17 to 3824) and OTUk Forward Error Correction (Rows 1 to 4, Columns 3825 to 4080). The frame area of the Forward Error Correction (OTUk FEC) contains the Reed-Solomon FEC codes that must be calculated as specified in the Annex A of ITU-T Recommendation G. 709. That is to say, the client layer payload, when mapped into the optical channels, is boxed up in a "super-frame" with an own POH, a payload and a redundancy part for the error correction, whereby a payload electric processing is performed.

The idea of the present invention consists in reserving a byte of the ODUk OverHead (or of the OTUk Overhead) to perform the concatenation of the Optical channel. Whereby the OverHead of this "super frame" is associated with the optical channels as if it were a POH of a Virtual Container in the SDH or SONET transmissions. In the reserved byte a counting flag indicating the concatenation status with respect to other frames will be inserted. In reception, when such super frame is reconverted into electric signal, the receiver, once recognized the concatenation status, extracts the information concerning the relative shift of the channels, equalizes them and provides the reconstructed client signal.

BRIEF DESCRIPTION OF THE DRAWINGS

There now follows a detailed description of the present invention, given by way of a mere non limiting example, to be read with reference to the various figures, wherein.

BEST MODE FOR CARRYING OUT THE INVENTION

Figure 1:
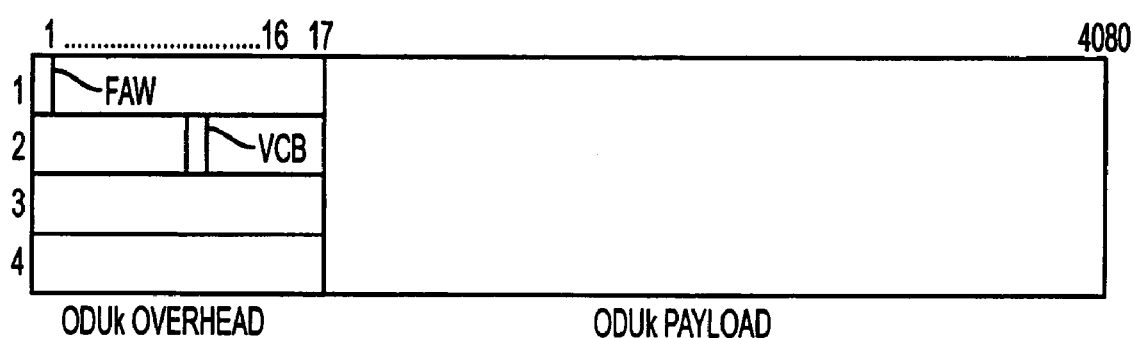
FIG. 1 shows an ODUK frame with related header and related payload.

In FIG. 1 an ODUk frame is indicated in which the header part and the information part (payload) are easily recognized. For clarity and by way of a mere example, only two bytes of the OverHead, namely the alignment word (FAW) and the virtual concatenation byte (VCB) have been highlighted. Both may also be not complete bytes. In fact, even some bits of them only could be respectively dedicated to the frame alignment and to the concatenation. However, for clarity only, throughout the present description and claims, frequence will always be made to a complete byte in any case, but it is to be kept in mind that this definition will also include the case of some bits of a byte (even one only). While the position of the alignment word is fixed, the position of the concatenation byte is indicative and anyhow substantially of no effect on the invention; the only obligation is to utilize a free byte (or part of byte), i.e. not reserved for other standardized purposes.

Figure 2:
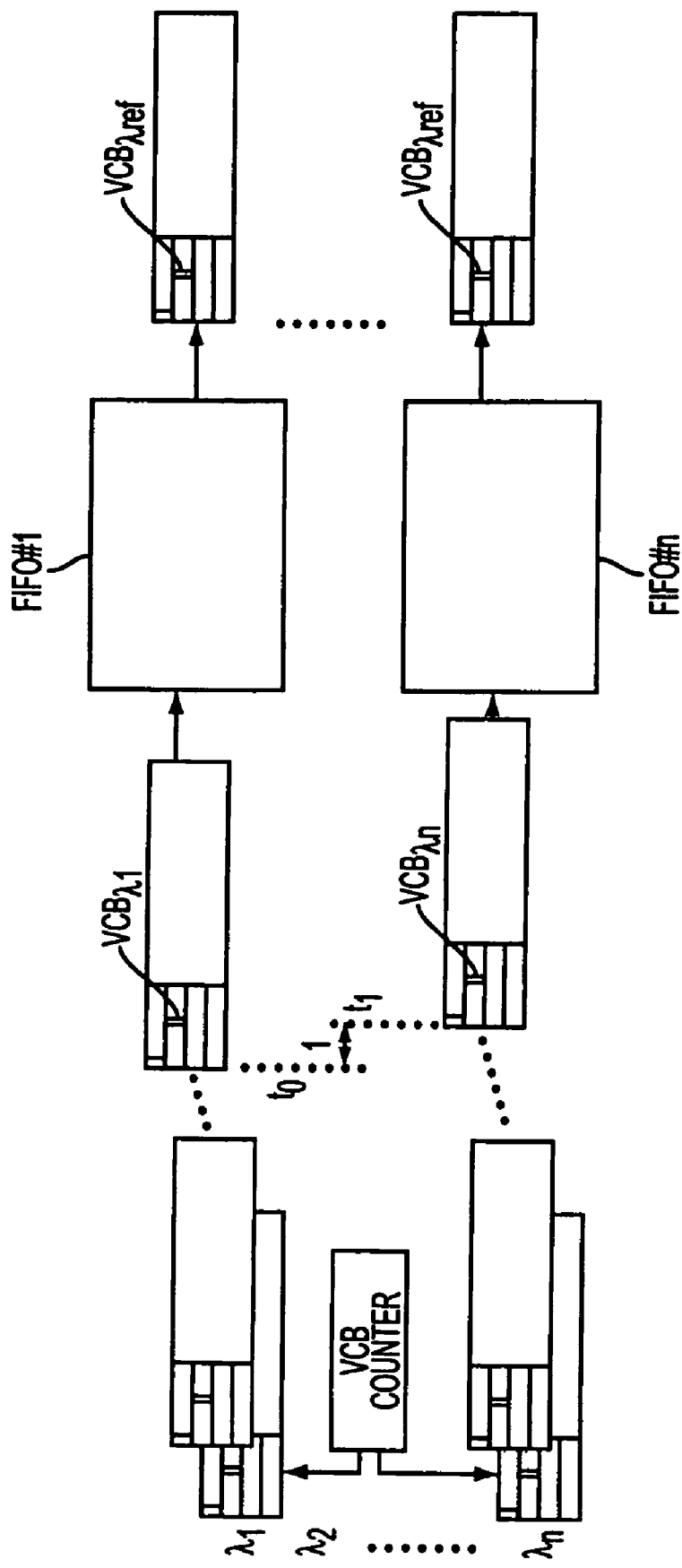
FIG. 2 shows n concatenated channels $\lambda_1, \lambda_2, \ldots, \lambda_n$.

In transmission (FIG. 2, left-hand side) a counter VCB COUNTER writes the same particular value (concatenation flag) in the appropriate byte reserved for the virtual concatenation of the various ODUk frames. Therefore, to transmit signals whose information contents cannot be all contained in the payload of a sole frame, several frames will concatenate by writing the same VCB value into each of them.

In other words, in the position of the VCB byte of the $ODUk_{\lambda_1}$ frame to be transmitted over the first channel ($\lambda 1$), a certain value VCB#z is written; at the same time, in the position of the VCB byte of the $ODUk_{\lambda_1}$ frame to be transmitted over the second channel ($\lambda 1$) the same value VCB#z is written, and so on till the VCB of the $OTUk_{\lambda_n}$ frame. The frames are then transmitted in a concatenated and perfectly aligned way.

In reception, the concatenation bits are read and, the concatenation status between the frames being recognized, the payloads are reported as a unique payload of a "super-frame".

In an "ideal" situation, the frames that have been sent aligned over the various channels, are received at the same time, i.e. still perfectly aligned. However, in a real situation, the frame of a channel will be leading (like ODU 1 with respect to ODU$_n$ in FIG. 2), or lagging, with respect to the other n−1 frames of the n−1 channels. In this situation a frame will be delayed (or advanced) with respect to the other by storing it into an appropriate elastic store (FIFO). An elastic store is contemplated for each channel. The present invention provides in a non limiting way for choosing a reference channel and computing the delays and the advances with respect to such reference channel.

Therefore, in reception, a reference frame is received, the value of the corresponding concatenation byte VCB is read and stored into the corresponding elastic store. Advantageously, the reference frame is stored centered into the elastic store, in a barycentric position. Preferably, the reference frame is the one transmitted over the first channel ($\lambda_1$) but there is nothing to prevent the frames of any other channel from being regarded as reference frames.

As to the other n−1 channels, the frames received just after the reference frame are read and stored into respective elastic stores and the time t is computed between the instant ($t_0$) when the alignment word of the reference frame is received and the instant ($t_1$) when the alignment word of the other frames received subsequently is received. In addition, for the received n−1 frames, the concatenation byte value is read and the possible difference from the reference frame is computed. Such difference ($\Delta_{VCB}$) is multiplied by the frame period T and added to the time t.

In other words, for every channel x, the following calculation is carried out:

$$\Delta_x = t + (VCB_{\lambda rif} - VCB_{\lambda x})T, \text{ with } 1 \leq x \leq n,$$

and the frame received over the channel x is delayed/advanced by a time $\Delta_x$.

As a practical example, let's consider the frame of channel $\lambda_1$ as a reference frame. At a certain instant $t_0$, $VCB_{\lambda 1}$ will be read as concatenation byte value and a certain $FAW_{\lambda 1}$ will be read. The frame in channel $\lambda_2$ will arrive at an instant $t_1$, i.e. after a certain time t with respect to $t_0$. The time t is computed by comparing the time of arrival of $FAW_{\lambda 2}$ with respect to $FAW_{\lambda 1}$. The value of $VCB_{\lambda 2}$ corresponding to the frame in the channel $\lambda_2$ will also be read: such value may be equal to the reference frame one, or it may also be greater or smaller.

In practice, usually the difference $\Delta_{VCB}$ (=$VCB_{\lambda 1}$−$VCB_{\lambda 2}$) will be null and therefore the reference frame will be delayed by a time t only. If the difference is positive, it means that the frame in channel 2 is lagging the reference one; if it is negative, this means that the frame in channels 2 is leading the reference one. The same computations and the same considerations apply to the frames in channels $\lambda_3$, $\lambda_4$, ... $\lambda_n$.

Since FIFO elastic stores are used, such stores will be increased/decreased according to the needs. It is however worth noticing that the latency time in the FIFO stores can be considered negligible as compared with the latency time of a frame in a network.

It is known that the respective delay accumulated by two optical channels spaced out 30 nm. apart in an optical fiber (without regenerators) compliant with standard requirements is about 0.6 µs/1000 Km. Every regenerator may contribute with a respective delay of about 15 ns due to the different latency that the digital processing may introduce on different channels along the regenerator. Considering long spans and a number of regenerators (for instance 20), the delay becomes greater and greater (20×15 ns=300 ns). Therefore, such storages should be not larger than about ten frames, equivalent to about 100 µs.

Figure 3:
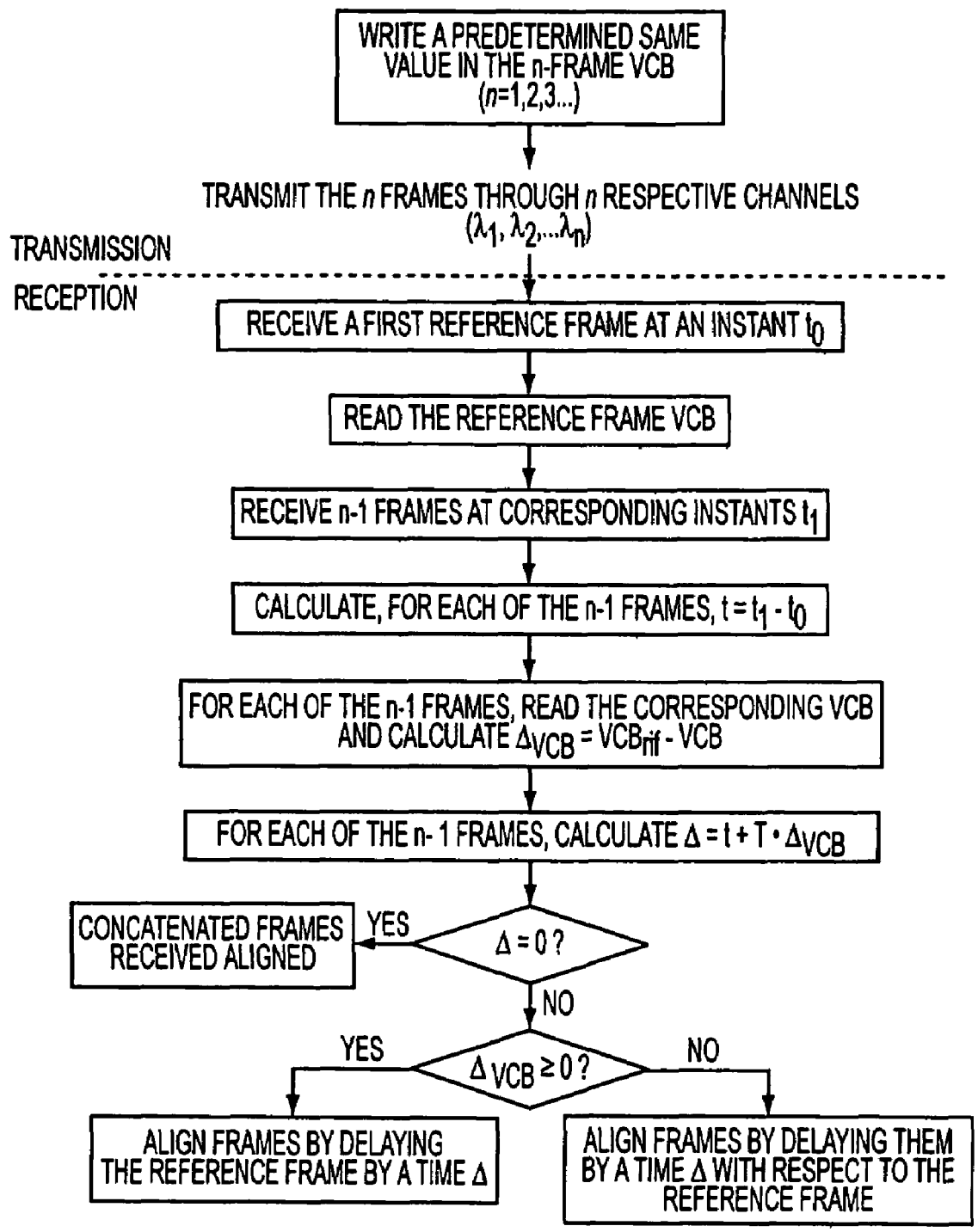
FIG. 3 shows a flow chart in which the main steps of the concatenation method according to the invention have been indicated.

The various steps of the method of the invention can be summarized as follows, with reference to FIG. 3.

The various steps of the method of the invention can be summarized as follows, with reference to FIG. 3.

In transmission:
writing the same pre-established value into the virtual concatenation byte (VCB) of n-frame (n=1, 2, 3, ... ); and
transmitting the n frames through n respective channels ($\lambda_1$, $\lambda_2$, ... $\lambda_n$) (FIG. 4).

Figure 4:
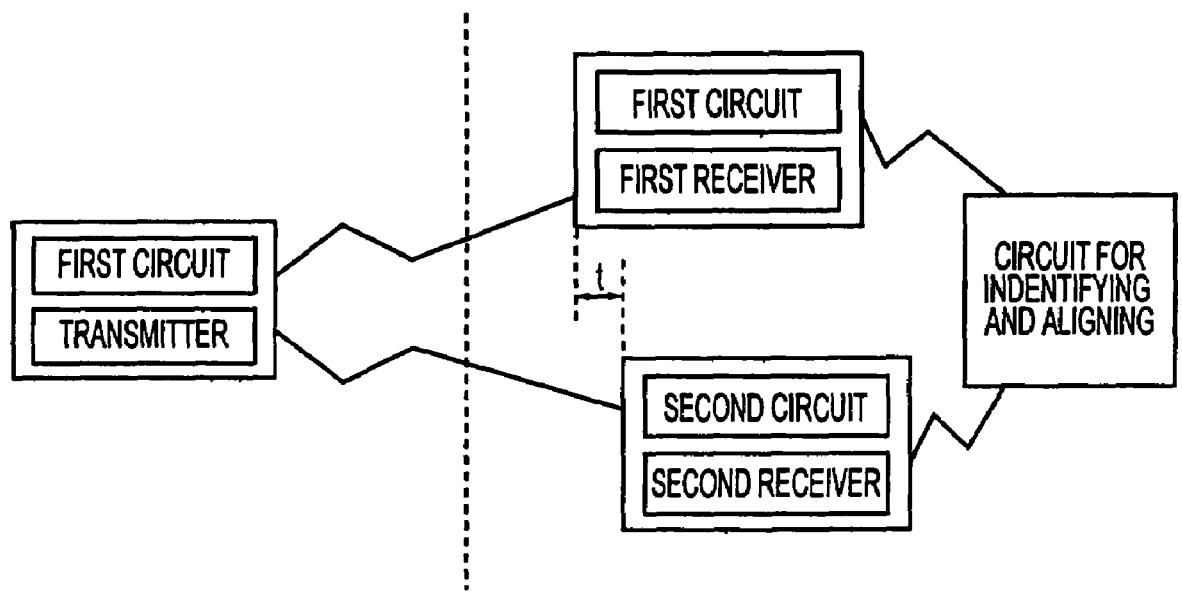
FIG. 4 shows a first circuit transmitter and a first receiver, first circuit, second receiver, second circuit and circuit for identifying and aligning in an exemplary embodiment of the present invention.

In reception:
receiving a first reference frame at an instant $t_0$;
reading the virtual concatenation byte (VCB) of the reference frame;
receiving n−1 frames at corresponding instants $t_1$;
calculating, for each of the n−1 frames, $t=t_1-t_0$;
for each of the n−1 frames, reading the corresponding VCB and calculating $\Delta_{VCB}=VCB_{rif}-VCB$;
for each of n−1 frames, calculating $\Delta=t+T(VCB_{rif}-VCB)$; and
aligning the frames depending on the corresponding value $\Delta$ obtained (FIG. 4).

The advantages achieved by the present invention and the applications thereof are apparent. In general the present invention overcomes the present limitations of the IP routers given by the TDM technology limiting the maximum bit-rate attainable by each port. The concatenation technique can be the basis for the implementation of a flexible broadband transport service at optical level, satisfying one of the most important needs for data-centered networks.

The concatenation techniques in accordance with the invention introduces a high level of flexibility in the WDM transport networks, since it easily supports an evolution of a network at higher bit rates, without all network nodes being able to manage such maximum bit rate. This fact is adavantageous both in the design of new networks (that can be dimensioned for medium bit rates for instance 2.5 Gb/s, but not necessarily for peak bit rates, for instance 10 Gb/s) that for existing networks (at low bit rates, e.g. 2.5 Gb/s but that must connect to new networks at higher bit rates, for instance 10 Gb/s). In both cases the economic advantage attained through the saving of hardware equipment is apparent.

The concatenation technique according to the present invention anticipates the availability of even higher bit rates with respect to the evolution of the TDM (Time Division Multiplexing) technology. For example, a 40 Gb/s payload can be carried simply by having (and concatenating) 10 Gb/s signals, a 160 Gb/s payload can be carried by concatenating 10 Gb/s or 40 Gb/s signals and so on.

Lastly, the concatenation technique according to the present invention allows the transportation of "unconventional" bit rates without loosing bandwidth, namely a 5 Gb/s signal could be easily carried by concatenating two 2.5 Gb/s signals or four 1.25 Gb/s signals and so on.

A new optical channel concatenation technique in WDM networks has been described, which satisfies all the above intended objectives. Many changes, modifications, variations and different uses of the present invention, however, will become clear to those skilled in the art having considered the present description and the attached drawings illustrating preferred embodiments thereof. Such changes, modifications, variations and different uses that do not depart from the spirit and scope of the invention are deemed to be covered by the invention that is limited only by the following claims.

The invention claimed is:

1. A method, for virtually concatenating optical channels in a WDM network, comprising:
   providing for a plurality of frames, each frame comprising a byte reserved for a concatenation flag;
   writing a same value defined in advance into the n-frame (n=1, 2, 3, . . . ) concatenation byte;
   transmitting the n frames through n respective channels in the WDM network; and
   receiving the n frames,
   wherein each frame is received on a same channel number assigned at the transmission side.

2. The method according to claim 1, further comprising:
   receiving a number n of virtually concatenated signal frames in a WDM network, which comprises:
   receiving a first reference frame at an instant $t_0$;
   reading a concatenation byte value of such reference frame;
   receiving the remaining n−1 signal frames after a respective determined time t;
   reading the concatenation byte value of the remaining n−1 signal frames; and
   identifying and aligning all the signal frames with the same concatenation byte value compensating for the receiving time t in the WDM network.

3. A method according to claim 2, wherein the aligning of all the signal frames with the same concatenation byte value comprises:
   receiving the remaining n−1 signal frames at corresponding instants $t_1$;
   calculating, for each of the remaining n−1 frames, the time t elapsed from the instant at which the reference frame has been received;
   providing, for every channel, an elastic store; and
   holding steady the elastic storage of the reference channel and moving the others in dependence of the calculated times t.

4. A method according to claim 2, wherein the receiving of the remaining n−1 signal frames comprises:
   reading a frame alignment word of the reference frame at a first instant $t_0$;
   reading the frame alignment word of the remaining n−1 frames at corresponding second instants $t_1$; and calculating the time differences t between the first instant $t_0$ and the corresponding second instants t1.

5. A method according to claim 2, further comprising:
   calculating possible differences between the concatenation byte value of the reference frame and the concatenation byte value of the remaining n−1 frames,
   multiplying said possible differences by the frame period T, and
   adding the value obtained to the respective time differences t.

6. The method for virtually concatenating optical channels in a WDM network, according to claim 1, wherein the byte reserved for a concatenation flag is not fixed.

7. A WDM network comprising:
   a first apparatus which virtually concatenates a plurality of optical channels, the first apparatus comprising:
   a first circuit adapted to provide for a plurality of frames, each frame comprising a byte reserved for a concatenation flag indicating concatenation of the plurality of frames, and adapted to write a same pre-defined value into the concatenation flag of the plurality of frames; and
   a transmitter adapted to transmit the plurality of frames over the plurality of optical channels in the WDM network;
   a second apparatus comprising:
   a first receiver adapted to receive the plurality of frames, wherein each frame is received on a same optical channel number assigned by the transmitter.

8. The WDM network according to claim 7, wherein the first receiver is further adapted to receive a first reference frame from the plurality of frames at a time t0 and adapted to read the concatenation flag value of said first reference frame; and
   wherein the second apparatus further comprises:
   a second receiver adapted to receive the remaining plurality of frames after a corresponding pre-defined time t and to read the concatenation flag value of said remaining plurality of frames; and
   a second circuit adapted to identify and align the plurality of frames having the same concatenation flag value.

9. The method for virtually concatenating optical channels in a WDM network, according to claim 7, wherein the byte reserved for a concatenation flag is not fixed.

* * * * *